United States Patent Office 3,219,678
Patented Nov. 23, 1965

3,219,678
PROCESS FOR REDUCING THE HYDROLYZABLE CHLORINE CONTENT OF ORGANIC ISOCYANATES
Ehrenfried H. Kober and Trescott B. Larchar, Sr., Hamden, Conn., assignors to Olin Mathieson Chemical Corporation, a corporation of Virginia
No Drawing. Filed Feb. 28, 1963, Ser. No. 261,837
7 Claims. (Cl. 260—453)

The present invention relates to a new process for the purification of organic isocyanates and, more particularly, to a procedure for reducing the amount of hydrolyzable chloride contained in organic isocyanates.

Organic isocyanates are important intermediates in the manufacture of rubber and rubber-like materials, adhesive coating agents, insulating agents, and a wide variety of other synthetic plastic materials. Organic isocyanates are readily prepared from amines, corresponding to the isocyanates desired, either by direct phosgenation of the free amines, by phosgenation of the amine hydrochloride, or via the corresponding carbamyl chlorides in the presence of a suitable solvent. The crude reaction products thus obtained are usually treated at temperatures in the range of 80 to 150° C. with an inert gas such as nitrogen to remove unreacted phosgene and hydrogen chloride which is formed at the elevated temperature by disassociation of carbamyl chlorides into hydrogen chloride and the respective organic isocyanate. The degassed product is then distilled to separate the solvent from the isocyanate. If desired, the isocyanate thus obtained can be distilled and fractionated for further purification.

In order to impart desirable properties to foams and other plastic materials prepared from isocyanates, the isocyanate has to contain a relatively small percentage of hydrolyzable chloride. If the hydrolyzable chloride content of an isocyanate is too low for any specific application, compounds such as benzoyl chloride can be added in order to increase the content of hydrolyzable chloride to the desired level. If the content of hydrolyzable chloride present in an isocyanate is too high for any specific application, the product must either be blended with material of very low hydrolyzable chloride content or be used for applications which do not require isocyanates of low hydrolyzable chloride content. In practice, the content of hydrolyzable chloride of the products obtained in the manufacture of organic isocyanates is sometimes undesirably high and, therefore, methods have been sought to reduce the content of hydrolyzable chloride in the isocyanate products. To achieve this objective, treatment of isocyanates with such compounds as ferric chloride, aluminum chloride, and other metal halides is disclosed in French Patent No. 1,284,256. These metal halides, however, are not only expensive, but also promote polymerization of isocyanates and, consequently, cause partial consumption of the isocyanate thus treated.

The disadvantage in the previously known processes for reducing the concentration of hydrolyzable chloride in organic isocyanates can be overcome by heating said organic isocyanates in the presence of small amounts of water as revealed in copending application Serial No. 234,531, filed October 31, 1962, now U.S. Patent No. 3,179,680, in the name of Ehrenfried H. Kober. Although the latter process effects the reduction of the concentration of hydrolyzable chloride in organic isocyanates to desirable levels, the amount of the organic isocyanate is sometimes slightly reduced.

It is the primary object of the present invention to provide a process for reducing the concentration of hydrolyzable chloride in organic isocyanates containing hydrolyzable chloride.

It is another object of the invention to effect the reduction of the hydrolyzable chloride contained in organic isocyanates without reducing the amount of the organic isocyanate.

These and other objects of the invention will be apparent from the following detailed description.

It has now been discovered that the concentration of hydrolyzable chloride can be substantially reduced when an organic isocyanate containing hydrolyzable chloride is heated at temperatures which are considerably above those temperatures required and used for the cleavage of organic carbamyl chlorides into organic isocyanates and hydrogen chloride. Reduction of the hydrolyzable chloride concentration according to our process is obtained without any reduction of the amount of the organic isocyanate but rather results usually in an increase of the amount of the organic isocyanate and an increase of the yield of the isocyanate after isolation by distillation as compared to the yield obtained by distillation without prior heating. This result is surprising and unexpected in view of the known reactions which organic isocyanates are reported to undergo at elevated temperatures to form carbodiimides or polymeric materials.

The process of this invention may be employed in the treatment of various types of organic isocyanates containing hydrolyzable chloride. For example, crude organic isocyanate solutions which have been degassed and separated from substantially all of the solvent, but which still contain resinous by-products and hydrolyzable chloride in a concentration usually between about 0.015 and about 1.0 percent or higher can readily be purified in accordance with the novel technique of this invention. In addition, concentrated crude solutions of organic isocyanate which contain approximately equal parts of isocyanate and resinous by-product formed by the distillation of a portion of the organic isocyanate from the crude organic isocyanate solution described above may also be purified. Also, the relatively pure isocyanate solution formed by the distillation of the above-mentioned crude organic isocyanate, or otherwise prepared, may be treated in accordance with the technique of this invention to reduce the concentration of any hydrolyzable chloride that may be contained therein.

Isocyanates which may be purified by heating in accordance with the technique of this invention include the aromatic mono- and poly-isocyanates as well as the aliphatic mono- and poly-isocyanates and hydroaromatic mono- and poly-isocyanates. Typical examples of suitable organic isocyanates include hexylisocyanate, octylisocyanate, dodecylisocyanate, octadecylisocyanate, tetramethylene diisocyanate, pentamethylene diisocyanate, octamethylene diisocyanate, undecamethylene diisocyanate, dodecamethylene diisocyanate, 3,3'-diisocyanate dipropyl ether, cyclohexyl isocyanate, tetrahydro-α-naphthyl isocyanate, tetrahydro-β-naphthyl isocyanate, xylene diisocyanates, dipheylmethane 4,4'-diisocyanate, β,β'-diphenylpropane 4,4'-diisocyanate, benzyl isocyanate, phenylethyl isocyanate, p-isocyanato benzyl isocyanate, phenyl isocyanate, p-cetyl phenyl isocyanate, p-dodecylphenyl isocyanate, 5-dodecyl-2-methylphenyl isocyanate, 3-nitro-4-dodecylphenyl isocyanate, p-cetyloxyphenyl isocyanate, metaphenylene diisocyante, p-phenylene diisocyanate, naphthylene 1,4-diisocyanate, 2,4-tolylene diisocyanate, 2,6-tolylene diisocyanate, 1,3,5-benzene triisocyanate, tetrahydrofurfuryl isocyanate, and mixtures thereof.

The temperature at which the treatment according to the present invention is carried out may range from about 150 and about 300° C., but is preferably in the range between about 180 and about 260° C. At temperatures above 180° C., the hydrogen chloride or phosgene formed by heating of the compound responsible for the content of hydrolyzable chloride is usually removed by agitating the isocyanate product at the elevated temperature, but purging with nitrogen or another inert gas may also be utilized to promote the removal of the hydrogen chloride or phosgene formed. If desired, the heat-treated isocyanate products can be subjected to distillation, which promotes further reduction of the content of hydrolyzable chloride.

The reaction period is generally between about 0.5 and about 120 minutes, and preferably between about 3 and about 70 minutes.

Heating of the organic isocyanate in a nitrogen atmosphere is frequently advantageous.

While we do not wish to be limited by theory (since the nature of the materials which are responsible for the hydrolyzable chloride content of the isocyanate compositions is not known precisely), it is believed that the impurities which are responsible for the hydrolyzable chloride are not carbamyl chlorides, since the latter compounds are known to cleave already at temperatures of between 80 to 120° C. to form isocyanates and hydrogen chloride. Apparently, the compounds responsible for the presence of hydrolyzable chloride after the usual purging procedure at between 80 and 150° C. require higher temperatures for their cleavage into hydrogen chloride and/or phosgene and organic isocyanates and, possibly, other products of unknown structure. The cleaved hydrogen chloride and/or phosgene escapes as a gas when the heated isocyanate product is agitated at the elevated temperature.

As pointed out previously, it is preferred to employ organic isocyanates containing a small proportion (between about 0.005 and about 0.025 percent by weight) hydrolyzable chloride in the preparation of poly-urethanes. Organic isocyanates of this type are easily prepared by the process of this invention when the heat-treated isocyanate products are distilled. Crude, undistilled organic isocyanates containing not more than 0.2 percent of hydrolyzable chloride, which can be utilized in the manufacture of certain polymers, can also easily be prepared by the process of this invention.

The following examples are presented without any intention of being limited thereby. All parts and percentages are by weight unless otherwise specified.

Example I

A crude reaction mixture resulting from the phosgenation of toluene diamine in monochlorobenzene was degassed at 130° C. with nitrogen; subsequently, the solvent was removed by distillation. This gave a crude product containing 68.87 percent of toluene diisocyanate and 0.412 percent of hydrolyzable chloride. This product was heated to 190° C. and stirred at this temperature for one hour while nitrogen was passed through. This procedure resulted in a product containing 0.106 percent of hydrolyzable chloride and, after distillation in vacuo, afforded toluene diisocyanate which contain 0.01 percent of hydrolyzable chloride. The amount of toluene diisocyanate isolated by distillation, as compared to the amount of isocyanate products found by titration of the isocyanato groups in the unheated material charged, was unchanged.

Example II

A crude reaction mixture resulting from the phosgenation of toluene diamine in monochlorobenzene was degassed at 130° C. with nitrogen; subsequently, the solvent and part of the toluene diisocyanate were removed by distillation in vacuo. The resultant product contained 83.6 percent of toluene diisocyanate and 0.859 percent of hydrolyzable chloride. This product was then heated to and stirred at between 190 and 225° C. for 15 minutes, after which period of time the hydrolyzable chloride had been reduced to 0.338 percent. Subsequent distillation in vacuo resulted in toluene diisocyanate containing 0.021 percent of hydrolyzable chloride. In the control experiment, in which the crude material containing 83.6 percent of toluene diisocyanate and 0.859 percent of hydrolyzable chloride was distilled in vacuo without prior heat treatment, the content of hydrolyzable chloride in the distillate was only reduced to 0.039 percent. The amount of toluene diisocyanate isolated by distillation of the heat-treated material was 1.9 percent higher than the amount of toluene diisocyanate obtained by distillation in the control experiment.

Example III

A crude reaction mixture resulting from the phosgenation of toluene diamine in monochlorobenzene was degassed at 130° C. with nitrogen; subsequently, the solvent and part of the toluene diisocyanate were removed by distillation in vacuo. The crude toluene diisocyanate, thus obtained, contained 84.2 percent of toluene diisocyanate and 0.727 percent of hydrolyzable chloride. This product was heated to and stirred at between 220 and 240° C. for 15 minutes, after which period of time the content of hydrolyzable chloride had been reduced to 0.166 percent. Subsequent distillation in vacuo resulted in toluene diisocyanate containing 0.011 percent of hydrolyzable chloride. In the control experiment, in which the crude material containing 84.2 percent of toluene diisocyanate and 0.727 percent of hydrolyzable chloride was distilled in vacuo without prior heat treatment, the content of hydrolyzable chloride in the distillate was only reduced to 0.036 percent. The amount of toluene diisocyanate isolated by distillation of the heat-treated material was 1.9 percent higher than the amount of toluene diisocyanate obtained by distillation in the control experiment.

Example IV

A crude reaction mixture resulting from the phosgenation of toluene diamine in monochlorobenzene was degassed at 130° C. with nitrogen; subsequently, the solvent and part of the toluene diisocyanate were removed by distillation in vacuo. The resulting product contained 84.2 percent of toluene diisocyanate and 0.727 percent of hydrolyzable chloride. This product was then heated to and stirred at between 220 and 240° C. for 15 minutes while nitrogen was passed through. This resulted in a product containing 0.123 percent of hydrolyzable chloride. Subsequent distillation in vacuo gave toluene diisocyanate which contained 0.006 percent of hydrolyzable chloride. A second experiment, which was performed with the same crude material under identical conditions, resulted in a product containing 0.151 percent of hydrolyzable chloride before distillation and 0.009 percent of hydrolyzable chloride after distillation. In the control experiment, in which the crude material containing 84.2 percent of toluene diisocyanate and 0.727 percent of hydrolyzable chloride was distilled in vacuo without prior heat treatment, the content of hydrolyzable chloride in the distillate was only reduced to 0.036 percent. The amount of toluene diisocyanate isolated by distillation of the heat-treated material was 0.7 percent (Experiment 1) and 2.2 percent (Experiment 2) higher than in the control experiment.

Example V

A crude reaction mixture resulting from the phosgenation of toluene diamine in monochlorobenzene was degassed at 130° C. with nitrogen; subsequently, the solvent and part of the toluene diisocyanate were removed by distillation in vacuo. The resulting product contained 84.2 percent of toluene diisocyanate and 0.727 percent of hydrolyzable chloride. This product was then heated to and stirred at 252° C. for 5 minutes, after which period of time the hydrolyzable chloride had been reduced to 0.133 percent. Subsequent distillation in vacuo resulted in toluene diisocyanate containing 0.008 percent of hydrolyzable chloride. In the control experiment, in which the crude material containing 84.2 percent of toluene diisocyanate and 0.727 percent of hydrolyzable chloride was distilled in vacuo without prior heat treatment, the content of hydrolyzable chloride in the distillate was only reduced to 0.036 percent. The amount of toluene diisocyanate isolated by distillation of the heat-treated material was 3.0 percent higher than the amount of toluene diisocyanate obtained by distillation in the control experiment.

Various modifications of the invention, some of which have been referred to above, may be employed without departing from the spirit of this invention. The process may be carried out in either a batchwise manner or a continuous manner. In view of these modifications, we do not wish to be limited except as defined by the following claims.

We claim:

1. In the process for purifying a crude organic isocyanate by passing an inert gas through said isocyanate to remove hydrogen chloride and phosgene contained therein, distilling, in a first distillation step, the resulting degassed material to remove solvent contained therein, and distilling, in a second distillation step, the residue of the first distillation step to remove the organic isocyanate from residual impurities, the improvement which comprises heating the residue of the first distillation step to a temperature in the range between about 150° and about 300° C. prior to said second distillation step, whereby the concentration of the hydrolyzable chloride is substantially reduced.

2. The process of claim 1 wherein said residue of the first distillation step is heated to a temperature in the range between about 180° and about 260° C.

3. The process of claim 1 wherein said residue of the first distillation step is heated for a period of between about 0.5 and about 120 minutes.

4. The process of claim 1 wherein said residue of the first distillation step is heated for a period of between about 3 and about 70 minutes.

5. The process of claim 1 wherein said organic isocyanate is toluene diisocyanate.

6. The process of claim 5 wherein said residue of the first distillation step is heated at a temperature in the range between about 180° and about 260° C.

7. The process of claim 6 wherein said residue of the first distillation step is heated for a period of between about 3 and about 70 minutes.

References Cited by the Examiner

UNITED STATES PATENTS

| | | | |
|---|---|---|---|
| 2,680,130 | 6/1954 | Flores | 260—453 |
| 2,683,160 | 7/1954 | Irwin | 260—453 |
| 2,884,435 | 4/1959 | Tazuma | 260—453 |
| 3,155,699 | 11/1964 | Powers | 260—453 |
| 3,163,666 | 12/1964 | Kirss et al. | 260—453 |

FOREIGN PATENTS 1,284,256  3/1961  France.

CHARLES B. PARKER, *Primary Examiner.*